(No Model.)  4 Sheets—Sheet 1.

M. HUTIN & M. LEBLANC.
DIRECT CURRENT DYNAMO ELECTRIC MACHINE.

No. 575,116.  Patented Jan. 12, 1897.

WITNESSES,
C. E. Marshall.
F. T. Chapman

INVENTORS:
Maurice Hutin,
Maurice Leblanc,
By Joseph Lyon
ATTORNEY.

(No Model.) 4 Sheets—Sheet 2.

M. HUTIN & M. LEBLANC.
DIRECT CURRENT DYNAMO ELECTRIC MACHINE.

No. 575,116. Patented Jan. 12, 1897.

WITNESSES,
C. E. Marshall
F. T. Chapman

INVENTORS:
Maurice Hutin,
Maurice Leblanc,
By Joseph Lyon
ATTORNEY.

(No Model.) 4 Sheets—Sheet 3.

M. HUTIN & M. LEBLANC.
DIRECT CURRENT DYNAMO ELECTRIC MACHINE.

No. 575,116. Patented Jan. 12, 1897.

WITNESSES:
C. C. Marshall
F. T. Chapman

INVENTORS:
Maurice Hutin,
Maurice Leblanc,
By Joseph Lyon
ATTORNEY.

(No Model.) 4 Sheets—Sheet 4.

M. HUTIN & M. LEBLANC.
DIRECT CURRENT DYNAMO ELECTRIC MACHINE.

No. 575,116. Patented Jan. 12, 1897.

WITNESSES,
C. E. Marshall.
F. F. Chapman

INVENTORS:
Maurice Hutin,
Maurice Leblanc,
By Joseph Lyon
ATTORNEY.

UNITED STATES PATENT OFFICE.

MAURICE HUTIN AND MAURICE LEBLANC, OF PARIS, FRANCE, ASSIGNORS TO THE SOCIÉTÉ ANONYME POUR LA TRANSMISSION DE LA FORCE PAR L'ÉLECTRICITÉ, OF SAME PLACE.

DIRECT-CURRENT DYNAMO-ELECTRIC MACHINE.

SPECIFICATION forming part of Letters Patent No. 575,116, dated January 12, 1897.

Application filed February 12, 1894. Serial No. 499,851. (No model.) Patented in France June 29, 1893, No. 231,205, and in England December 4, 1893, No. 23,308.

*To all whom it may concern:*

Be it known that we, MAURICE HUTIN and MAURICE LEBLANC, citizens of the Republic of France, residing in Paris, France, have invented certain new and useful Improvements in Dynamo-Machines for either Generating or Receiving Continuous Currents, of which the following is a specification.

This invention is the subject of Letters Patent in France, No. 231,205, dated June 29, 1893, and in Great Britain, No. 23,308, dated December 4, 1893.

Our invention relates to improvements in direct-current dynamo-electric machines, and has for its main object to reduce the size and complexity of the commutators in multipolar dynamos.

In ordinary direct-current dynamos the number of segments of the commutator must increase in direct ratio to the number of pairs of poles of the field-magnets, and in commercial multipolar machines this number becomes very large and the commutator becomes a very complicated and expensive structure. In the dynamos constructed in accordance with our invention the number of segments of the commutator is independent of the number of poles of the field and is only as great as would be required for a two-pole machine of the same general type. This reduction of the number of commutator-segments necessitates, however, the driving of the commutator at a higher speed than that of the armature or of the field-magnets, as the case may be.

Figure 1:
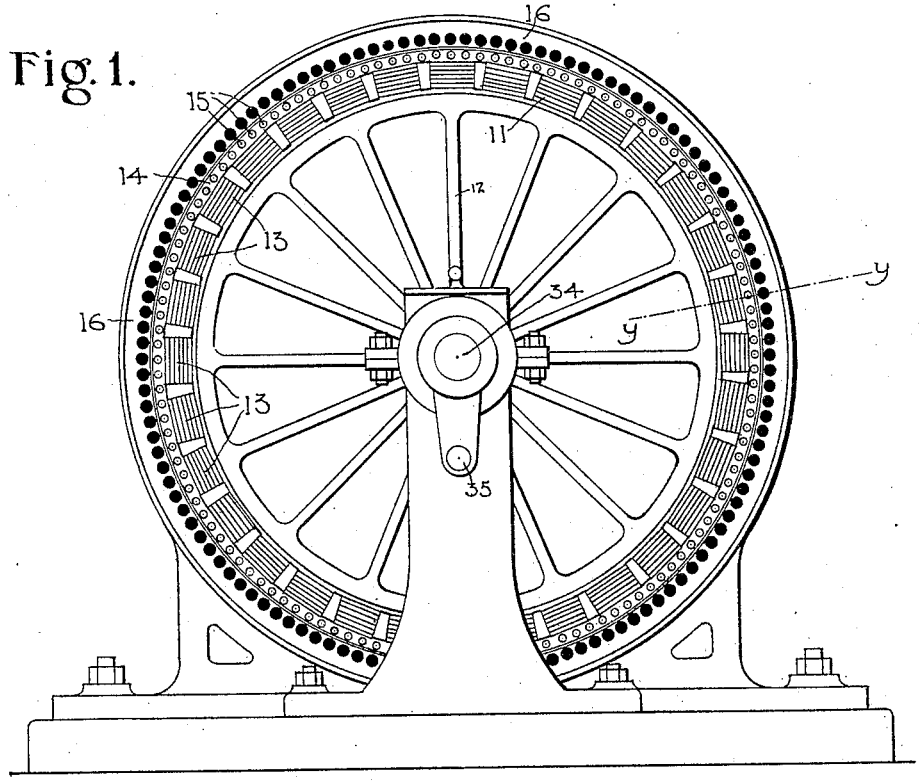
Figure 2:
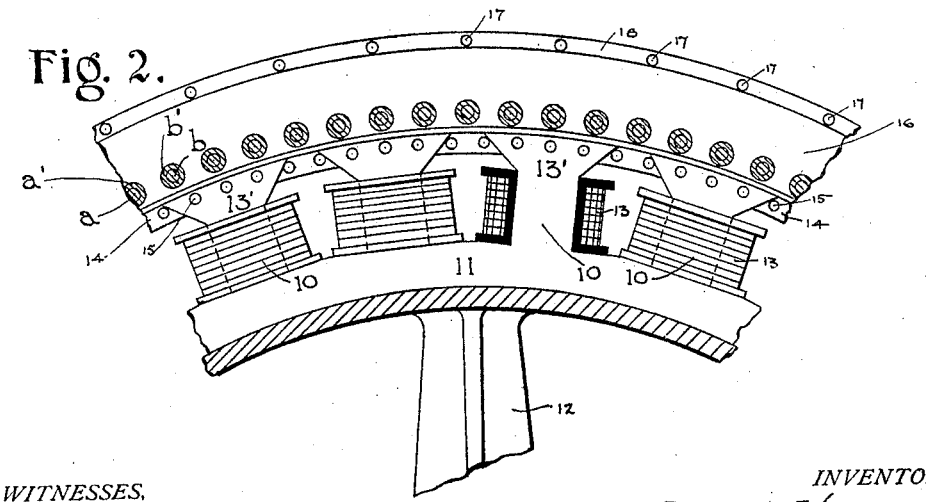
Figure 3:
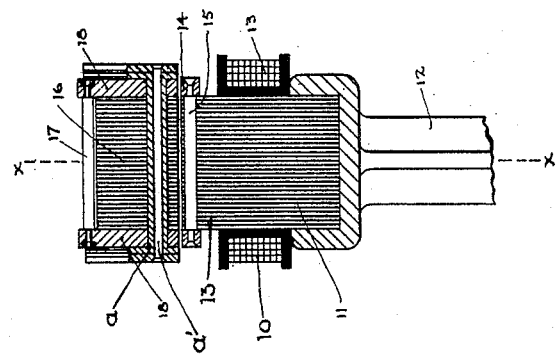
Figure 4:
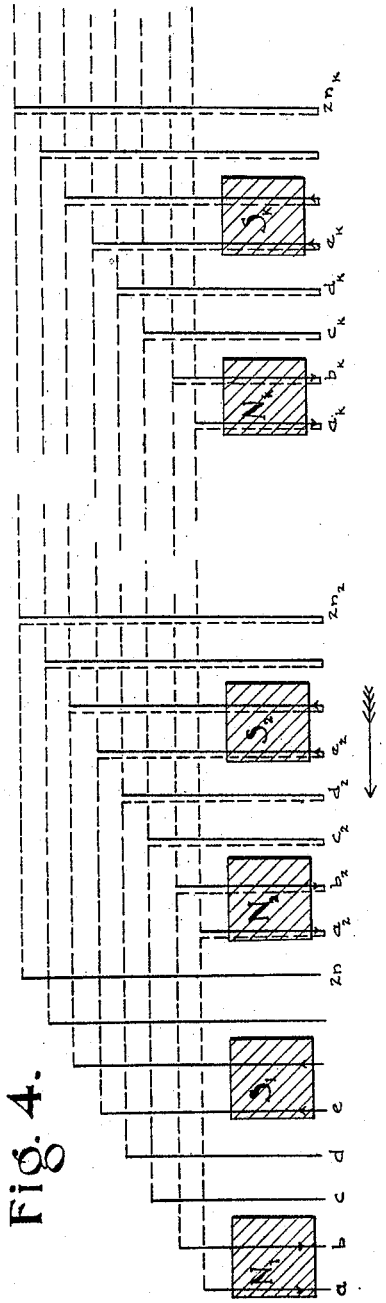
Figure 5:
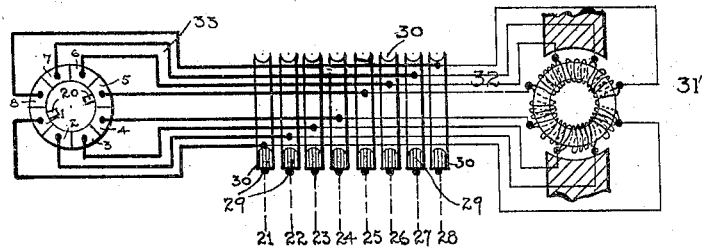
Figure 6:
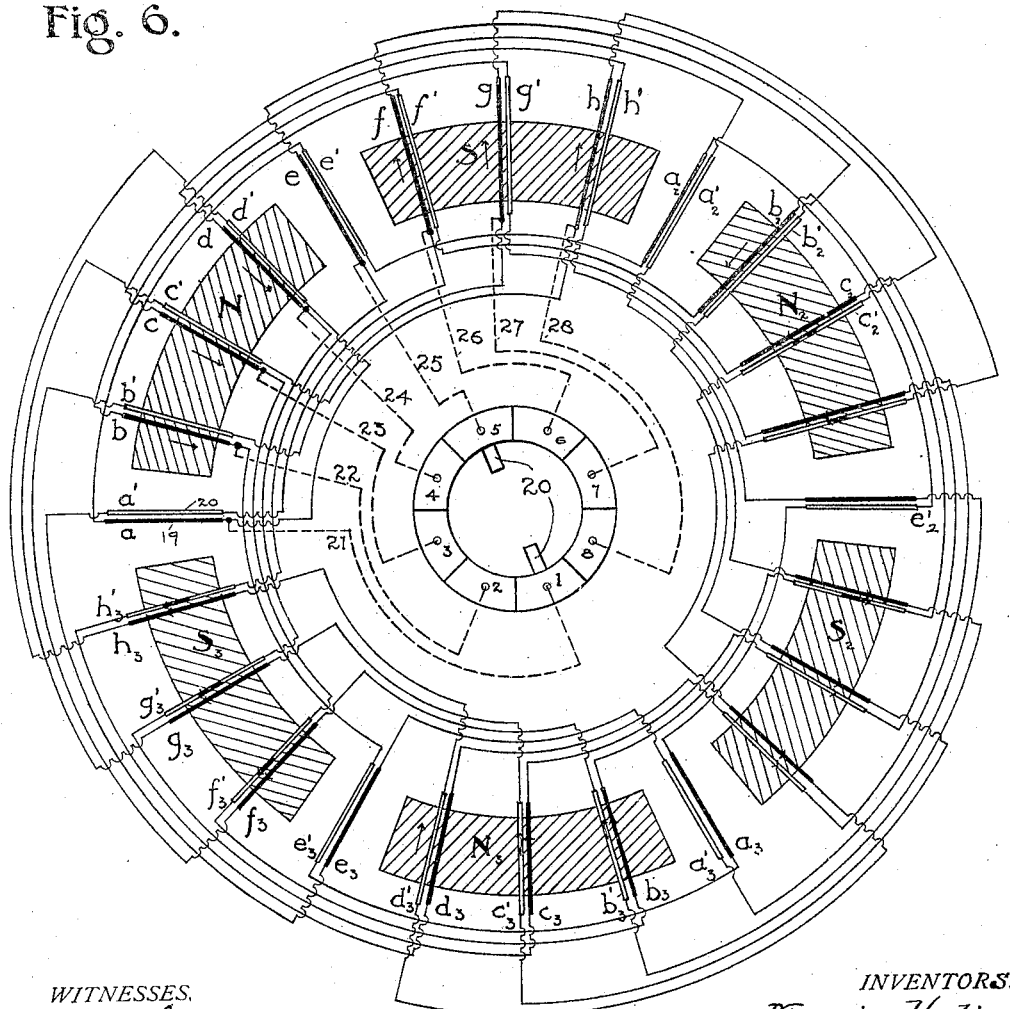
Figure 7:
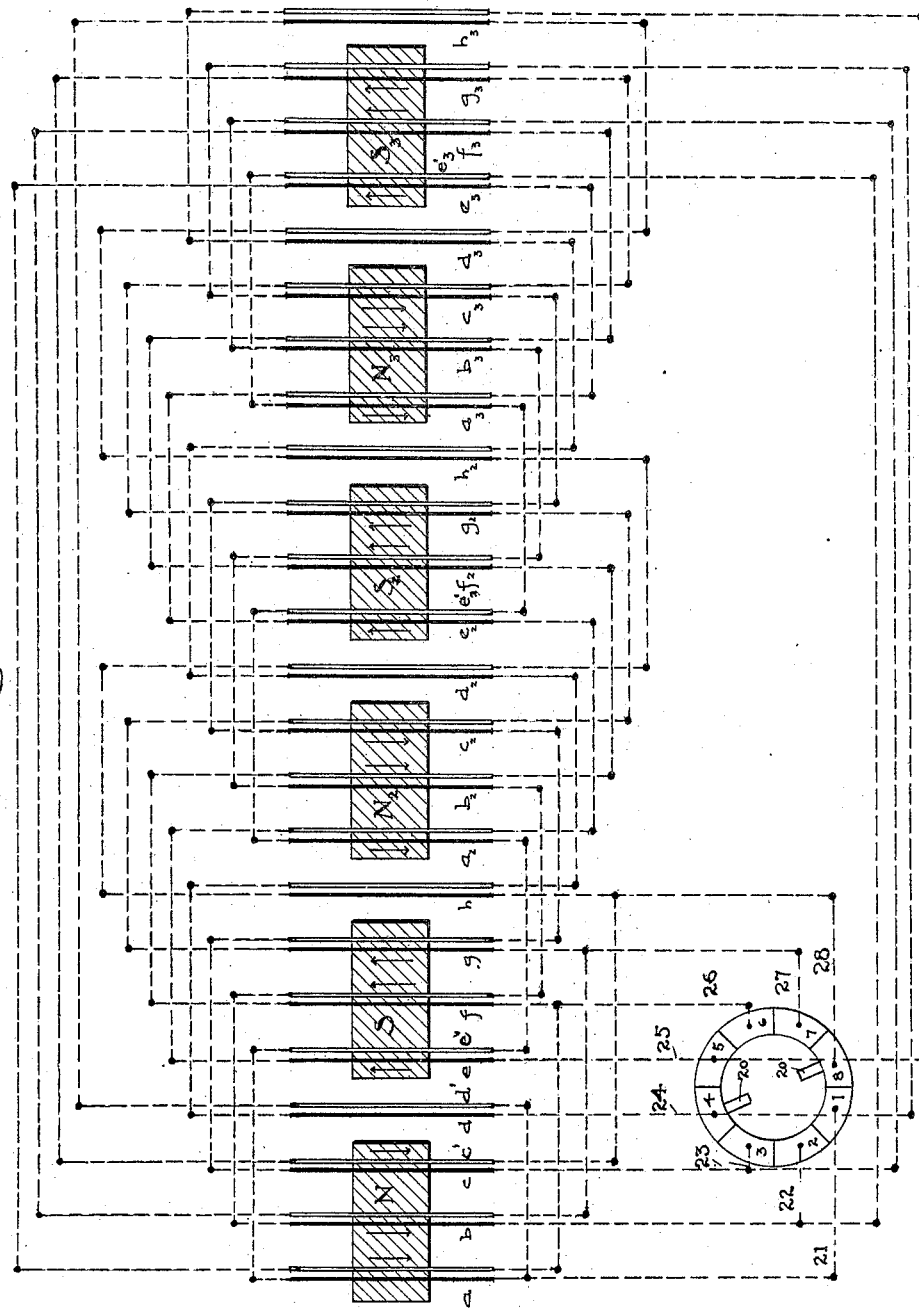

In the accompanying drawings, which form a part of this specification, Figure 1 represents an end elevation of our improved dynamo-machine in one of the forms which it may assume. Fig. 2 is an end elevation, partly in section, on line $x$ $x$ of Fig. 3. Fig. 3 represents a cross-section on the line $y$ $y$ of Fig. 1. Fig. 4 is an explanatory diagram. Fig. 5 is a diagram of the commutator, a driving mechanism for the same, and the circuit connections for both. Fig. 6 is a diagram of the armature-circuits and their connections with the commutator in a machine having three pairs of poles, and Fig. 7 is a development of the same.

Like letters and numerals of reference indicate like parts throughout the specification.

The fundamental idea upon which our invention is based may be explained in a general manner with reference to Fig. 4. In this diagram the letters $N'$ $S'$, $N^2$ $S^2$, $N^k$ $S^k$ may represent the $2k$ poles of a multipolar dynamo, which poles in the actual construction of the machine would be arranged in circular order, but which here are shown developed. If the space between any two like points of two adjacent like poles be divided into an even number of equal parts, say into $2n$ parts, and if at each point of division a conductor traverses the field, then if either the field-magnets or the conductors are shifted, one with reference to the other, it will be evident that the electromotive forces generated in these conductors will be dephased with reference to each other by $\frac{1}{2n}$ of a period. If this division of spaces and placing of conductors at the points of division is repeated and continued all around the circular row of pole-pieces, and if these conductors are marked, as in Fig. 4, by the letters $a\ b\ c\ d\ 2n$, $a^2\ b^2\ c^2\ d^2\ 2n^2$, $a^k\ b^k\ c^k\ d^k\ 2n^k$, so that the conductors which are similarly situated with reference to the N and S poles are marked with the same letters, but with different indices, then the phase of electromotive force in the conductors $a\ a^2\ a^3\ a^k$ will be the same, while the electromotive forces in the conductors $b\ b^2\ b^3\ b^k$ will be dephased with reference to the electromotive forces of the first-named conductors by $\frac{1}{2n}$ of a period. If now the conductors which are subjected to the same induction are all connected in series, as indicated by dotted lines in Fig. 4, then we have $2n$ circuits, the electromotive forces in which are dephased with reference to each other by $\frac{1}{2n}$ of a period.

Supposing the field-magnets to be the movable portion of this system, and supposing them to move in the direction indicated by the arrow, it will be seen that each conductor will pass through all phases of electromotive force until the N pole of one index has reached the position which was formerly occupied by the N pole of the next lower index. Since we have assumed $2k$ poles in the machine, this condition will be repeated $k$ times during each complete revolution of the field-magnet system.

In the ordinary bipolar machine with $2n$ dephased currents the different circuits find themselves in the same relative position only once for each revolution of the field-magnets, or of the armature, as the case may be. It will now be seen that by connecting our $2n$ circuits to a commutator of $2n$ segments and by rotating it $k$ times faster than the system of $2k$ poles we achieve the same thing as if we had a commutator provided with $k$ times as many segments, but rotating with the speed of the field-magnets. These are the considerations which led to the construction of our improved multipolar continuous-current generator, as will now be readily understood by reference to Figs. 6 and 7. In Fig. 6 the pole-pieces of the field-magnets are shown as arranged circularly, and the commutator is shown concentric therewith, while in Fig. 7 the pole-pieces are developed into a straight line and the commutator is placed on one side thereof. In all other respects the two drawings are practically identical, and it is therefore immaterial to which of the two drawings the attention is directed.

There are three pairs of pole-pieces N S, $N^2 S^2$, $N^3 S^3$. The armature is here represented by straight conductors marked by the letters $a\ a'$, $b\ b'$, $c\ c'$, $h\ h'$; $a\ a^{2'}$, $b\ b^{2'}$, $h\ h^{2'}$, &c. The conductors $a\ b\ c\ a^2\ b^2\ c^2$, &c., are represented by heavy black lines, while the conductors $a'\ b'$, &c., and $a^{2'}\ b^{2'}$, &c., are represented by light double lines. The circuit connections between these armature-conductors are represented in Fig. 6 by light lines, and the connections to the commutator by broken lines, while both of these connections are represented in Fig. 7 by broken lines. These armature-conductors are supposed to be within the inductive influence of the field-magnets, in a manner which will hereinafter be shown. In the actual construction of the machine the conductors represented by the dark heavy lines are solid rods, while the conductors represented by the double lines are tubes insulated from the rods, but concentric therewith, so that each of the two conductors is subjected to the same condition of induction, whereby the electromotive force generated in each has the same direction and force. There being eight pairs of armature-conductors for each pair of poles the commutator has eight segments, 1 2 3 4 5 6 7 8. The connections between the armature-conductors are as follows:

For the sake of facilitating the description the ends of the armature-conductors which in the diagrams point toward the commutator will be spoken of as the "inner" ends, and the ends of the armature-conductors which point from the commutator will be spoken of as the "outer" ends. With this understanding, if we start with the solid conductor $a$, we find that its outer end is connected with the outer end of tubular conductor $e'$, and the inner end of $e'$ is connected with the inner end of the solid conductor $a^2$. The outer end of $a^2$ is connected with the outer end of $e^{2'}$, and the inner end of $e^{2'}$ is connected with the inner end of $a^3$, whose outer end is connected with the outer end of $e^{3'}$.

It will be observed that in making the connections so far described the electromotive forces in the conductors so connected are joined in series and that all these conductors are at any given moment subjected to the same conditions of induction alternately by an N pole and an S pole.

Since, in the example represented by the diagrams, there are eight pairs of armature-conductors for each pair of field-magnet poles, we have in this case $2n=8$, and since there are three pairs of field-poles we have in this case $2k=6$. It will now be observed that in making the connections so far described three pairs of armature-conductors have been skipped at each step, and if this is expressed in terms of the number of pairs of armature-conductors for each pair of poles it is found that $4-1$ pairs of conductors have been skipped, or more generally $n-1$ pairs of conductors, and that this was done $2k-1$ times. This mode of connection carried us to the bar $e^{3'}$, the inner end of which is now connected with the inner end of the solid-bar conductor $b$, that is to say, at this point, instead of skipping $n-1$ pairs of armature-conductors, $n$ pairs are skipped. From this point onward again the uniform skipping of $n-1$ pairs of conductors recurs $2k-1$ times, and then again $n$ pairs of armature-conductors are skipped, which brings us to the solid armature-conductor $c$. From this point onward again three, that is to say, $n-1$ pairs, of armature-conductors are skipped $2k-1$ times, and so forth, in regular recurrence, until we arrive at the tubular armature-conductor $d'$, the inner end of which is now connected with the inner end of the solid armature-conductor $a$, which brings us to the point of starting. From this it appears that all the armature-conductors are connected in one closed series. The series consists of eight, or, generally speaking, $2n$, groups of conductors, each group consisting of six, or, generally speaking, $2k$, bars and tubes, and the electromotive force in the conductors of each group is dephased with reference to the electromotive force in the conductors of the next adjacent groups by $\dfrac{1}{2n}$ of a period. This closed circuit is tapped to the eight commutator-segments in regular sequence by the conductors 21 22 23 28, as shown, the connection 21 being from bar $a$ to the commutator-segment 1, the connection 22 being from the bar $b$ to commutator-segment 2, and so forth. It is evident that the commutator-segments might be connected with any of the other sets of armature-conductors, such as $a^2 b^2 c^2 h^2$ or $a^3 b^3 h^3$, and it will now likewise be evident that the number of pairs of field-magnet poles has nothing to do with the number of commutator-segments, this number depending solely upon the number of pairs of armature-conductors for each pair of poles. It will now also be apparent that if in a machine of this kind there are $k$ pairs of field-poles, the commutator must rotate $k$ times faster than the field-magnets in order that the brushes 20 may collect continuous currents. This can be accomplished in a variety of ways, as, for instance, by multiplying-gearing connecting the field-magnets with the commutator or by driving the commutator by a separate alternating-current synchronous motor timed to rotate $k$ times faster than the field-magnet system. The construction to which this would lead is shown diagrammatically in Fig. 5, where the conductors 21 22 28 represent the connections which lead from the armature-conductors toward the commutator. In this figure of the drawings these connecting-conductors terminate in brushes 29, which bear each upon one of eight collector-rings 30, and these rings are supposed to be mounted upon the shaft of an alternating-current synchronous motor 31, the armature of which is connected by branch wires 32, derived from the different collector-rings, as is indicated by fine lines in Fig. 5. These collector-rings in turn are also connected with the segments 1 2 3 8 of the commutator, as indicated by heavier lines 33 in Fig. 5.

In the actual construction of the machine the field-magnet cores 10 rise from a common annular yoke 11, which yoke is mounted upon a spider 12. Both the yoke and the magnet-cores are built up of laminæ of soft iron, insulated from each other in the usual way, as shown in Fig. 3. The field-magnet coils 13 are so wound and connected as to give to the successive pole-pieces N and S polarity alternately, as is usual in machines of this kind, it being understood that the coils are fed with current in any desired manner. The pole-pieces 13' are expanded as shown. Two metal rings 14 14, one on each side of the pole-pieces, are connected together by rivets or bolts 15 15 of some good conducting material. We prefer to make both the rings and the rivets or bolts of gun-metal on account of its strength and good conductivity. These bolts are equally spaced and pass through the polar extensions and through the spaces between them, as may happen. In this manner are formed a number of circuits of very low resistance, which are not affected by the constant flux due to the field-coils, but tend to oppose strongly any variation of flux due to the armature reaction or other causes, as set forth and claimed in our Patent No. 529,272, dated November 13, 1894.

The armature 16 is also composed of a number of insulated laminæ assembled to form an annulus exterior to the field-magnet, and which laminæ are held together by insulated bolts 17 and cheeks 18. The cheeks and laminæ are perforated near the air-gap for the passage of the armature-conductors $a$ $a'$ $b$ $b'$, &c. The conductors $a b c$, &c., are solid rods of some metal of high conductivity, while the conductors $a'$ $b'$, &c., are preferably tubes of like metal, surrounding the rods, but insulated therefrom. We are not absolutely restricted to this construction of the pairs of conductors, since all that is necessary is that each conductor of a pair be subjected to practically the same conditions of induction from the field-poles.

The ends of the armature-conductors are connected with each other and with the commutator in accordance with the scheme described with reference to Figs. 6 and 7, but since it is impracticable to show this connection in a legible manner in Figs. 1 and 2 it has been there omitted. The spider-wheel 12, which supports the system of field-magnets, is mounted upon a shaft 34, and may be rotated by power connection in any suitable manner, as, for instance, by connection to the crank-pin 35.

The operation of the machine will now be obvious. Power is applied to the shaft of the machine and the field-magnets are driven at a suitable speed. Alternating multiphase electromotive forces are induced in the armature-conductors, which through the branch connections 32 furnish currents to the motor 31, which is driven as a multiphase synchronous motor at a speed equal to $k$ times that of the machine, whereby the commutator is also driven with that increased speed, and thus is in the same condition as the commutator of a two-pole generator, which latter is made to run $k$ times faster. Consequently the brushes 20 take off a continuous current.

It is obvious that this machine may also be used as a motor and that it may be altered in many ways without departing from our invention. We have already stated that it is immaterial whether the field-magnets be driven or the armature, and the changes of connections which would become necessary by such reversal would be readily made by one skilled in the art. It is also obvious that the commutator may be stationary and the brushes be made to rotate, or that both may rotate. It is also obvious that if a machine is built with a great number of poles the speed of the commutator may become greater than is convenient or safe, and in this case the number of segments of the commutator may be doubled and cross-connected in the usual way, like those of an ordinary multipolar machine, whereby it will require to be rotated, instead of $k$ times faster than the machine, only $\frac{k}{2}$ times faster.

Under all circumstances, in a machine of our construction, if the commutator is made $k$ times smaller or $\frac{k}{2}$ times smaller than would be required without our invention, it has to be rotated $k$ times faster or $\frac{k}{2}$ times faster; or, generally speaking, the commutator has to be run as many times faster as it is made smaller. The reason for this is that, with the construction shown, the arc through which a commutator-segment extends is greater than the arc subtended by two adjacent pairs of armature-conductors. In a machine with six pairs of poles and eight pairs of armature-conductors for each pair of poles, as shown in Figs. 6 and 7, each commutator-plate occupies an arc of forty-five degrees, (the insulation between the segments being disregarded,) while the arc subtended between two adjacent pairs of armature-conductors is only fifteen degrees. Thus it is seen that the arc of each commutator-segment measures three times as many degrees as the arc subtended between two adjacent armature-conductors, and that therefore the whole commutator need only be one-third as large as in an ordinary multipolar machine. Generally speaking, if there are $k$ pairs of poles in a multipolar machine constructed in accordance with our invention the arc of each commutator-segment has $k$ times as many degrees as the arc between two adjacent armature-conductors or coil-sections. Consequently the commutator as a whole may be $k$ times smaller than if the machine were constructed in the ordinary manner.

We have here shown and described each armature-section as composed of a solid rod and a tubular conductor through which the solid rod passes, and while this is the preferred construction we are not limited to the same, since the sections may be made up of differently-shaped and differently-related conductors, and this irrespective of the fact whether the armature or the field-magnet system be made the rotor of the machine.

Having now fully described our invention, we claim and desire to secure by Letters Patent—

1. A multipolar continuous-current dynamo-electric machine of the closed-circuit armature type, provided with a commutator having a lesser number of segments than there are armature-sections, and means for rotating the said commutator at a proportionally higher speed than the rotor, substantially as described.

2. A multipolar continuous-current dynamo-electric machine, having an equal number of uniformly-spaced armature-sections for each pair of field-poles, a commutator the number of segments of which is an aliquot of the total number of armature-sections, and means for rotating the commutator apparatus at a rate that is as many times greater than that of the rotor, as the aliquot is contained in the total number of armature-sections, substantially as described.

3. A multipolar continuous-current dynamo-electric machine, provided with an armature having an equal number of uniformly-spaced pairs of armature-conductors for each pair of field-poles; a commutator having a lesser number of segments than there are pairs of armature-conductors, and means for rotating the commutator proportionately faster than the rotor, substantially as described.

4. A multipolar continuous-current dynamo-electric machine, having an equal number of uniformly-spaced armature-sections for each pair of field-poles, a commutator having as many segments as there are armature-sections for each pair of field-poles and means for rotating the commutator as many times faster than the rotor as there are pairs of field-magnet poles, substantially as described.

5. A multipolar continuous-current dynamo-electric machine, having an equal number of uniformly-spaced pairs of armature-conductors for each pair of field-poles, a commutator having as many segments as there are pairs of conductors for each pair of field-poles, and means for rotating the commutator as many times faster than the rotor as there are pairs of field-magnet poles, substantially as described.

6. A multipolar continuous-current dynamo-electric machine, provided with an armature having an equal number of uniformly-spaced pairs of armature-conductors for each pair of field-magnet poles, and a commutator, each segment of which extends through an arc representing a multiple of the degrees of the arc subtended by any two adjacent pairs of armature-conductors, and means for rotating the commutator apparatus with the same multiple of the angular speed of the rotor, substantially as described.

7. A multipolar continuous-current dynamo-electric machine, provided with an armature having an even number of groups of induced-circuit conductors connected in one closed series, with each part of any one group in the same or directly opposite relation to the field-poles, but with each group in a different relation to the field-poles, and a commutator apparatus driven at a higher rate than the main machine, substantially as described.

8. A multipolar continuous-current dynamo-electric machine, having $2k$ field-poles and an armature having $2n$ groups of induced-circuit conductors, each group consisting of $2k$ conductors, all connected in a closed series, and the conductors so spaced with reference to the field-poles as to generate, at any instant, the same electromotive force in the conductors of the individual groups, but regularly dephased electromotive forces in the conductors of the different groups; in combination with a commutator having $2n$ segments, and means for driving it $k$ times faster than the main machine, substantially as described.

9. In a continuous-current multipolar dynamo-electric machine, the combination of field-magnets, an armature, a commutator, and an alternating-current synchronous motor, connected mechanically to said commutator and electrically to the windings of said armature, substantially as described.

10. In a dynamo-electric machine, a winding composed of pairs of conductors, one conductor of each pair being concentric with the other conductor of the same pair, substantially as described.

11. In a dynamo-electric machine, an armature having circuits composed of tubular conductors and solid conductors, the latter passing through and insulated from the tubular conductors, substantially as described.

In witness whereof we have hereunto signed our names in the presence of two subscribing witnesses.

MAURICE HUTIN.
MAURICE LEBLANC.

Witnesses:
 CLYDE SHROPSHIRE,
 JULES ARMENGAUD, Jeune.